(12) United States Patent
Ulbricht et al.

(10) Patent No.: US 6,753,396 B2
(45) Date of Patent: Jun. 22, 2004

(54) METHOD FOR PRODUCING TEMPLATE-TEXTURED MATERIALS WITH HIGH BINDING SPECIFICITY AND SELECTIVITY AND UTILIZATION OF SAID MATERIALS

(75) Inventors: Mathias Ulbricht, Berlin (DE); Tatinna Sergeyeva, Kiev (RU); Heike Matuschewski, Berlin (DE); Uwe Schedler, Berlin (DE); Sergey A. Piletsky, Kiev (RU)

(73) Assignee: Elipsa GmbH, Berlin (DE)

( * ) Notice: Subject to any disclaimer, the term of this patent is extended or adjusted under 35 U.S.C. 154(b) by 0 days.

(21) Appl. No.: 10/148,819
(22) PCT Filed: Dec. 1, 2000
(86) PCT No.: PCT/EP00/12095
§ 371 (c)(1),
(2), (4) Date: Sep. 3, 2002
(87) PCT Pub. No.: WO01/39881
PCT Pub. Date: Jun. 7, 2001

(65) Prior Publication Data
US 2003/0130462 A1 Jul. 10, 2003

(30) Foreign Application Priority Data
Dec. 3, 1999 (DE) .......................................... 199 59 264

(51) Int. Cl.[7] .............................................. C08F 220/46
(52) U.S. Cl. .................... 526/517.1; 526/348; 526/346; 526/303.1; 526/242; 526/274
(58) Field of Search ................................ 526/348, 346, 526/317.1, 303.1, 242, 274

(56) References Cited

U.S. PATENT DOCUMENTS 4,618,533 A * 10/1986 Steuck .................... 428/315.7
5,372,719 A * 12/1994 Afeyan et al. ........... 210/502.1
5,786,428 A * 7/1998 Arnold et al. ........... 525/333.3

FOREIGN PATENT DOCUMENTS

WO    WO 94/16319    *  7/1994
WO    WO 00/07702    *  2/2000
WO    WO 01/19886    *  3/2001

OTHER PUBLICATIONS

Wang et al., "Surface Molecular Imprinting on Photosensitive Dithiocarbomoyl Polyacrylonitrile Membranes using Photgraft Polymerization", J.Chem.Tech. Biotechnol., 70, 355–362 (1997).*

* cited by examiner

*Primary Examiner*—Ling-Siu Choi
(74) *Attorney, Agent, or Firm*—Norris McLaughlin & Marcus PA

(57) ABSTRACT

The invention relates to a method for the production of a template-textured material by synthesis of a template-textured polymer (TTP) by performing crosslinking polymerization of functional monomers on a support in the presence of a template, which method is characterized in that a support having a thin polymer layer on the surface thereof is added with a reaction mixture consisting of polymerization initiator, template, functional monomer, crosslinker, solvent and/or buffer and, following sorption of the reaction mixture in the thin polymer layer, the polymerization is initiated and continued until the absorption capacity of the thin polymer layer for the template-textured polymer (TTP) is reached, and the template is optionally removed in a final step, the support used being selected in such a way that it cannot absorb the reaction solution. The materials of the invention are remarkable for their high binding specificity and selectivity for the template.

19 Claims, 7 Drawing Sheets

METHOD FOR PRODUCING TEMPLATE-TEXTURED MATERIALS WITH HIGH BINDING SPECIFICITY AND SELECTIVITY AND UTILIZATION OF SAID MATERIALS

BACKGROUND OF THE INVENTION

The invention relates to a method for the production of new template-textured materials in the form of template-textured polymers (TTP) with high binding specificity and selectivity on a solid support and their use in substance-specific separation and analytics of materials.

In life sciences and biotechnology, new efficient separation and purification strategies and detection methods for substances such as enzymes, monoclonal antibodies, recombinant proteins or small biomolecules are being required. Similarly, this applies to synthetic active substances, and especially to those having a complex structure or/and relatively high molecular weight or/and limited stability.

In all these fields of use, there is an ongoing search for substance-specific high-performance materials, with high flexibility in adapting to the particular substances or active agents being required. Solid materials (particles, films, vessels, filters, membranes) are preferably used to make phase separation of solid and fluid flows of material easier. In contrast to separation methods based on dissimilar physical properties, chemical affinity to the support is a precondition for substance-specific separation. Substance specificity can be achieved via interactions between biological or biomimetic ligands and receptors. For affinity separations, either specific, yet highly sensitive biological ligands/receptors (e.g. antibodies, enzymes), or relatively unspecific synthetic ligands (e.g. dyes, metal chelates) have been used to date; examples are chromatography, solid-phase extraction, membrane separation, solid-phase assays, or sensors.

Non-porous films, layers or particles having affinity ligands on their surfaces exhibit a low specific surface area and thus, limited binding capacity. Porous materials having a larger specific surface area typically involve restricted binding capacity as a result of diffusion-related limitations. Analogous limitations may occur in packed particles. Directionally permeable porous filters or membranes are therefore particularly attractive alternative materials. Established membrane processes using porous membranes, such as micro- or ultrafiltration, operate according to the size exclusion principle. The separation of substances of similar molecular size using porous membranes additionally requires specific (affinity) interactions with the membrane.

The major motivation in using affinity membranes is the possibility of directional flow onto separation-specific groups (ligands/receptors) present in the pores at high density, enabling a dramatic improvement in effectiveness (less pressure drop, shorter residence time, higher flow rate, rarely diffusion-related limitations in pores, more rapid equilibration) as compared to analogous processes using particles. Such affinity membranes can be used in the separation of materials, e.g. purification, preferably of proteins, but also of many other substances (e.g. peptides, nucleic acid derivatives, carbohydrates, or various toxins, herbicides, pesticides), and even cells. Also, decontamination of material flows is a field of use for such membranes, involving many applications. Furthermore, affinity membranes provide many potential uses in analytics, e.g. in highly selective sample accumulation, e.g. by solid-phase extraction, or in the form of a quantitative determination of a substance on an affinity membrane, e.g. by means of ELISA.

A highly attractive alternative to biological or biomimetic affinity ligands/receptors for the separation or analytics of materials has been developed in recent years, involving the use of specific, yet exceedingly robust functional cavities ("molecular impressions") in synthetic polymers, produced via molecularly texturing polymerization (G. Wulff, Angew. Chem. 107, 1995, 1958; A. G. Mayes, K. Mosbach, Trends Anal. Chem. 16, 1997, 321; K. Haupt, K. Mosbach, Trends Biotechnol. 16, 1998, 468). To this end, polymerization of monomers is effected in the presence of template molecules (e.g. protein, nucleic acid, low-molecular weight organic substance) capable of forming a complex with a functional monomer, which complex is relatively stable during polymerization. After washing out the template, the materials thus produced are ready again to specifically bind template molecules. The polymers thus synthesized are referred to as template-textured polymers (TTP) or molecularly textured polymers (see FIG. 1).

Any substance having a well-defined three-dimensional morphology can be used as a template in the synthesis of TTP. Consequently, the classes of substances range from small molecules up to particles such as viruses, bacteria or cells. Compounds involving biological functions, such as peptides, nucleic acids or carbohydrates, are of particular interest. The recognition of templates by TTP is based on a combination of various factors such as reversible covalent or non-covalent bonding, electrostatic and hydrophobic interactions, hydrogen bonding and morphological complementarity. Which of these factors will dominate depends on template structure and properties, the functional monomer, the polymer structure, and the conditions of binding. In contrast to the covalent approach in TTP synthesis, which requires complex syntheses of template/monomer conjugates, the non-covalent approach is much more flexible. Frequently, electrostatic interactions are suitable in template recognition by TTP in hydrophobic solvents. In contrast, the morphological specificity and possibly, hydrophobic interactions are most important in template recognition in polar solvents. Preferably, TTP should be synthesized under conditions where strong, yet reversible interactions between polymer and template are favored. On the other hand, a combination of much weaker bonds including hydrogen bridges and hydrophobic interactions might be favorable for large molecules (about 200–1,000,000 Da). For small molecules (50–200 Da), a few strong interactions such as ionic bonds are necessary to obtain high affinity TTP. For example, the related production of polymeric sorbents in the presence of small organic molecules (U.S. Pat. No. 5,110,833) or macro-molecular substances (U.S. Pat. No. 5,372,719), or the synthesis of acrylamide or agarose gels in the presence of proteins (U.S. Pat. Nos. 5,728,296, 5,756,717) have been described. Peptide- or protein-specific sorbents produced using "surface texturing" of metal chelate structures on specifically functionalized particles (U.S. Pat. No. 5,786,428), or of carbohydrates in a plasma-polymerized layer have also been reported. TTP membranes produced using a special "surface texturing" process have also been described (WO 00/07702). A significant improvement in the synthesis of TTPs from aqueous solutions and for use in aqueous systems has been achieved by means of a special "surface texturing" process using special aqueous reaction solutions (patent application DE 198 42 641.1). In all these cases, good affinities for the respective template have been obtained.

The use of artificial antibodies and receptors produced by molecular texturing might involve enormous advantages, because these structures are much more stable compared to their natural analogues. Also, in principle, they can be synthesized for any substance (even for those having less pronounced antigenic properties, such as small molecules or immunosuppressives), and their production is much easier and more cost-effective compared to corresponding biomolecules. A crucial problem still restricting the potential uses of TTP is that non-specific interactions occur to a massive extent in addition to the desired affinity of the "molecular impressions" achieved by the TTP synthesis. In those few examples where TTP as a "plastic antibody" in assays is reported to have a remarkable template selectivity (relatively low "cross reactivity" to similar substances), only very few template impressions in the TTP and thus, those having the highest affinity are utilized (K. Haupt, K. Mosbach, Trends Biotechnol. 16, 1998, 468). In general, despite the specificity of TTP for the template compared to control polymers produced with no template, the latter will also bind the template, even though to a lesser extent. Consequently, the selectivity of binding of template compared to other, structurally similar or different substances is limited.

SUMMARY OF THE INVENTION

The object which the invention is based upon therefore is to develop template-textured materials having good affinity, high binding specificity and selectivity for the template and to provide a method of producing these materials.

The object of the invention is accomplished by means of a method for the production of a template-textured material by synthesis of a template-textured polymer (TTP) using a per se known crosslinking polymerization of functional monomers in the presence of a template on a support, wherein, according to the invention, a support having a thin polymer layer on the surface thereof is added with a reaction mixture consisting of polymerization initiator, template, functional monomer, crosslinking agent, solvent and/or buffer and, following sorption of the reaction mixture in the thin polymer layer, the polymerization is initiated and continued until the absorption capacity of the thin polymer layer for the template-textured polymer (TTP) is reached, and the template is optionally removed in a final step, the support used being selected in such a way that it cannot absorb the reaction solution.

Thus, according to the invention, a support is employed which e.g. previously has been modified on its surface with a thin polymer layer, minimizing non-specific binding of substances, e.g. of template. It is also possible to apply said polymer layer during the synthesis of the support, thereby retaining the inventive two-layer structure of the support.

According to the invention, the supports employed are not capable of absorbing the reaction solution, while said reaction solution is absorbed by the thin polymer layer on the support, in which layer the polymerization takes place.

a) Two-layer structure of a solid, mechanically stable support of any morphology: the support material has a thin polymer layer thereon which minimizes non-specific binding of substances to the support.

b) The reaction mixture for TTP synthesis, including template and functional monomer, and optionally initiator, crosslinker and solvent, is placed on the thin polymer layer, penetrating same but not the support material. Compared to the free monomer and the other components of the reaction mixture, the complex of template and functional monomer can be subject to hindrance by the thin polymer layer (e.g. "size exclusion effect"), which may result in an accumulation of template-complexed functional monomer on the exterior surface of the support. In control preparations with no template (and thus, with no complex), such effects are absent.

c) Crosslinking polymerization is initiated selectively on the boundary surface of support material/thin polymer layer or/and within the thin polymer layer; therefore, functionalization exclusively takes place within the thin polymer layer. The functional groups of the complexed functional monomer are fixed as "template impressions" preferably on the exterior surface of the support. In control preparations with no template, there is no accumulation of functional monomer on the exterior surface (cf., b)) and consequently, specific binding is absent and non-specific binding is exceedingly low. In contrast, the TTP composite material has high binding specificity and selectivity for the template (owing to the "template impressions"), with low non-specific binding (owing to the properties of the thin polymer layer).

Figure 3:
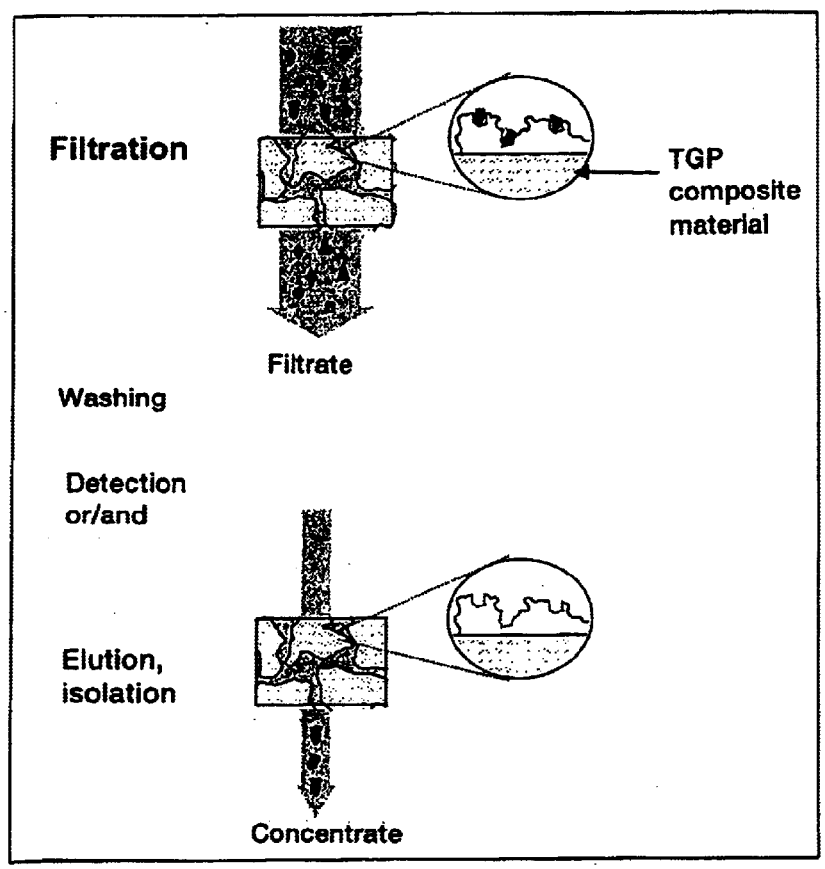

FIG. 3: Schematic illustration of the potential uses of TTP composite materials with high specificity and selectivity, exemplified by membranes for substance-specific affinity separation and/or analytics.

Figure 4:
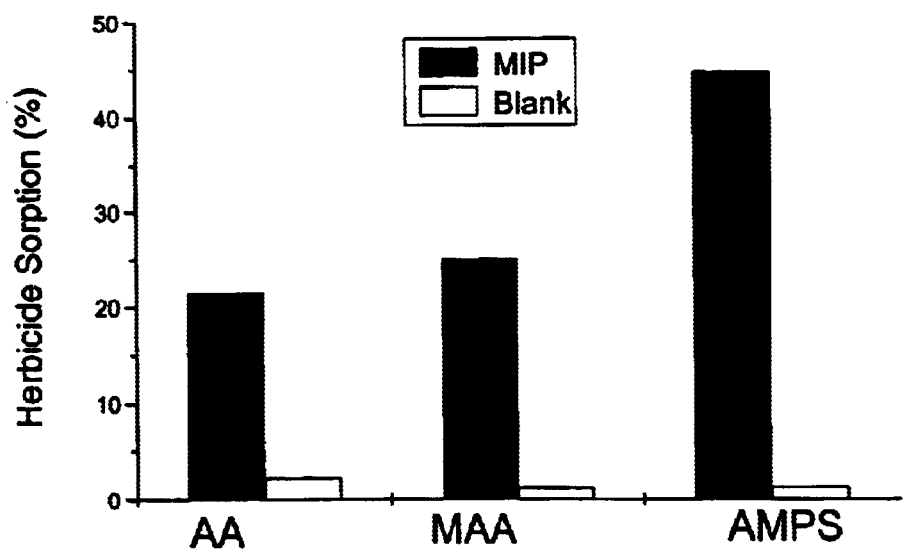

FIG. 4: Terbumeton sorption (from water) in filtration (cf., Example 2) for hydrophilized PVDF membranes following syntheses with (TTP) and without (blank) the Terbumeton template—variation of functional monomer (cf., Example 1a).

Figure 5:
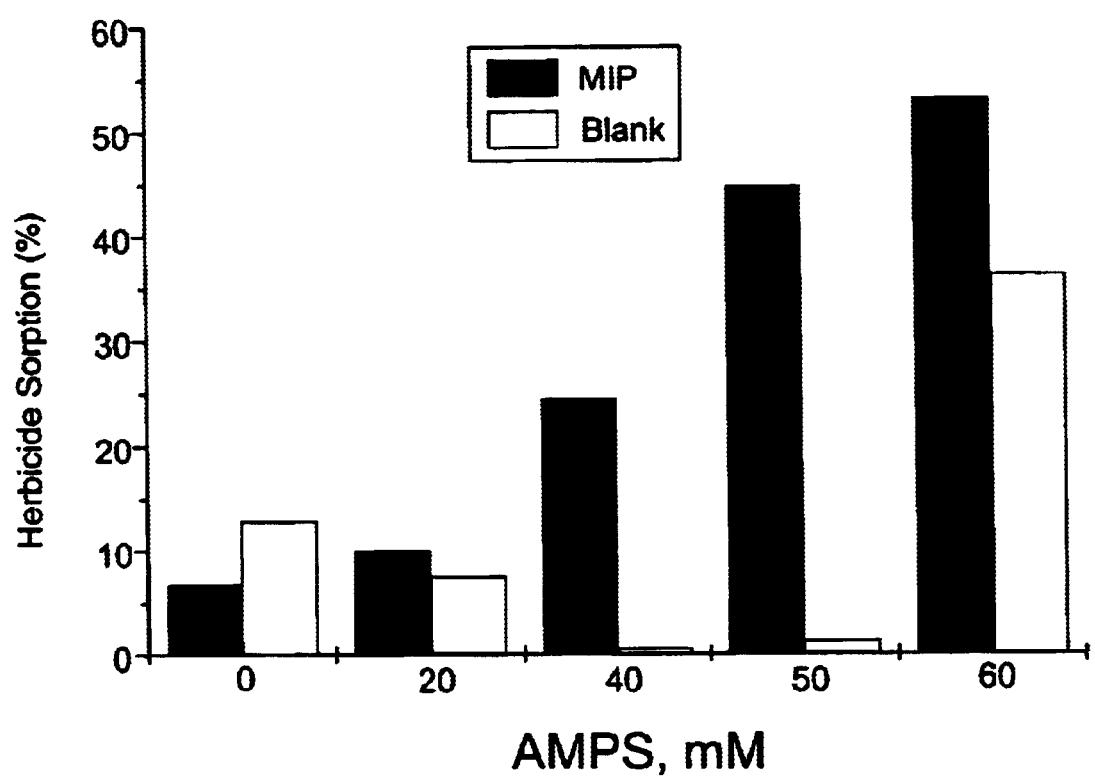

FIG. 5: Terbumeton sorption (from water) in filtration (cf., Example 2) for hydrophilized PVDF membranes following syntheses with (TTP) and without (blank) the Terbumeton template—variation of functional monomer concentration (cf., Example 1b).

Figure 6:
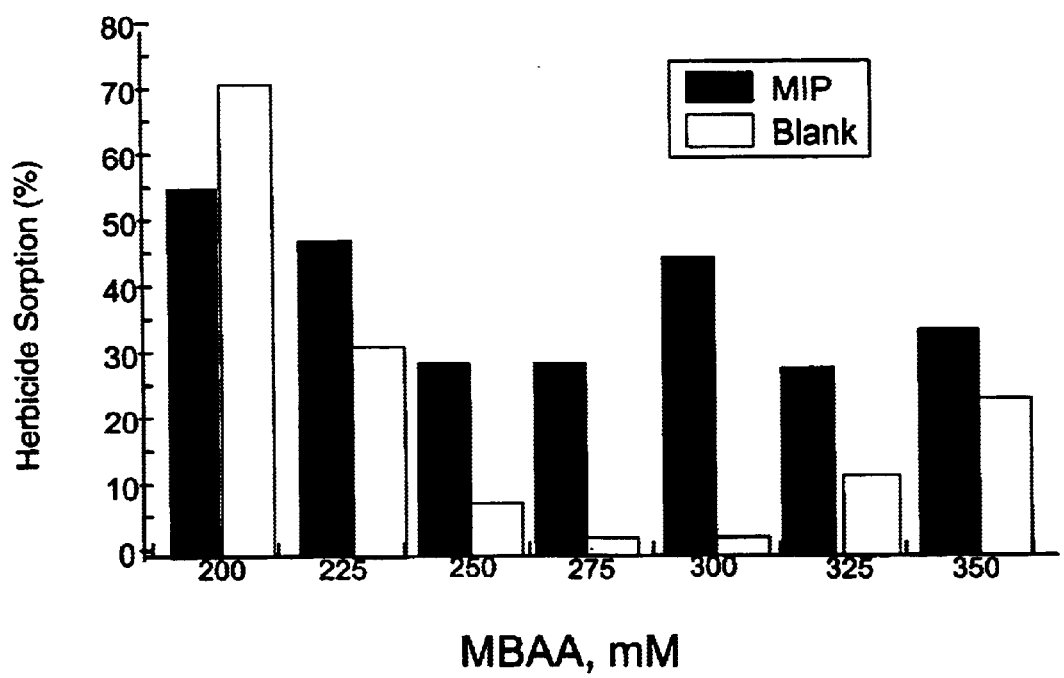

FIG. 6: Terbumeton sorption (from water) in filtration (cf., Example 2) for hydrophilized PVDF membranes following syntheses with (TTP) and without (blank) the Terbumeton template—variation of crosslinker concentration (cf., Example 1c).

Figure 7:
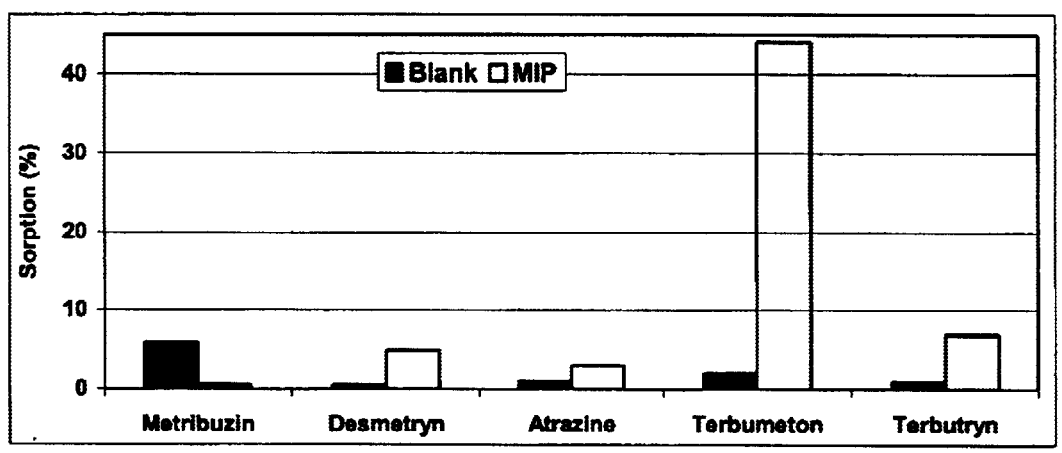

FIG. 7: Herbicide sorption (from water) in filtration (cf., Example 2) for hydrophilized PVDF membranes following syntheses with (TTP) and without (blank) the Terbumeton template—variation of functional monomer concentration (cf., Example 1a).

DETAILED DESCRIPTION OF THE PREFERRED EMBODIMENTS

In a preferred embodiment of the invention, molded pieces made of a hydrophobic material are used as support, while the thin polymer layer situated on the support is of hydrophilic nature.

It is in said thin polymer layer where TTP synthesis is initiated by crosslinking polymerization of the functional monomers in the presence of the template in aqueous or organic reaction solutions to form stable template impressions, thereby utilizing the thin polymer layer as a matrix for TTP synthesis. Surprisingly, a heretofore unmatched combination of TTP specificity and selectivity with minimal non-specific binding is achieved therein. Subsequently, the synthetic receptor structures in the form of template impressions can bind template molecules or template derivatives from organic or aqueous, saline solutions in a highly specific fashion. In this way, it is possible to use TTP materials in substance-specific methods of affinity separation and analytics.

In another embodiment of the invention, highly crosslinked organic polymers or inorganic solids incapable of absorbing hydrophilic or aqueous or hydrophobic reaction solutions are used as supports, and the thin polymer layer situated on the support can be both hydrophilic and hydrophobic in nature.

Thus, the new template-textured materials of the invention are comprised of TTP with high binding specificity and selectivity on a solid support. Non-specific binding of substances competing with template and of non-template is minimized by a previous additional functionalization or coating of said support with a thin polymer layer at the surface thereof, and at the same time, the thin polymer layer serves as a matrix for the synthetic receptor structures (template impressions).

According to the invention, coating the support with a thin polymer layer minimizing non-specific binding and TTP synthesis in said polymer layer can also be integrated into a single process step in a per se known fashion.

Figure 1:
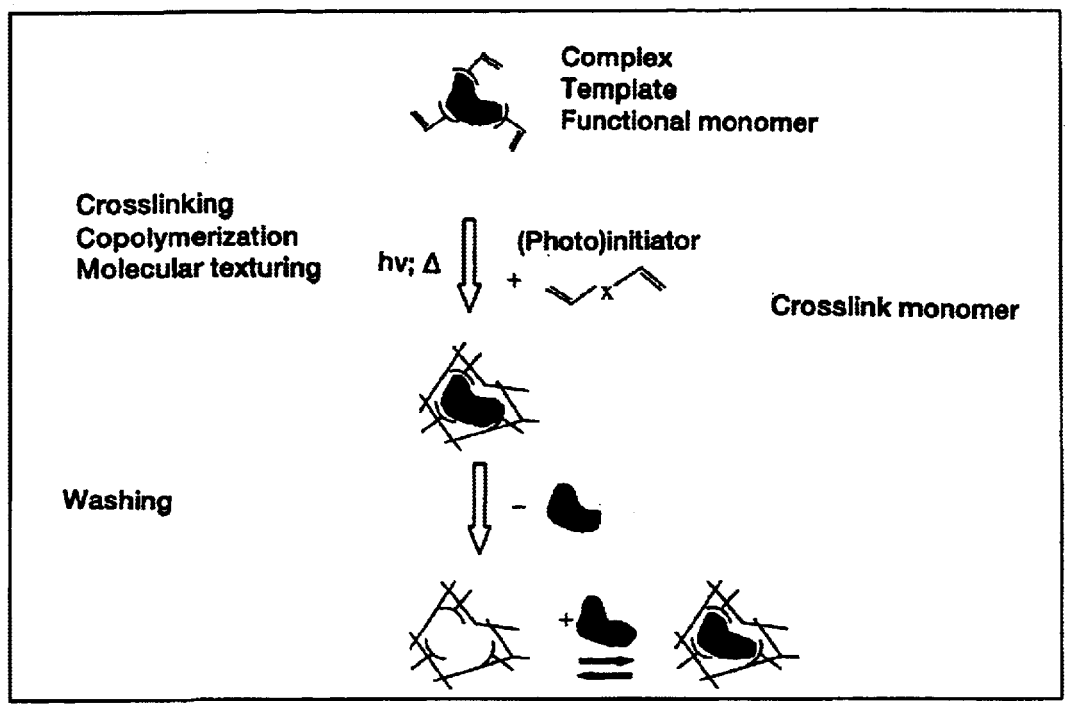
FIG. 1: Schematic illustration of the principles relating to the synthesis and function of template-textured polymers (TTP) according to the prior art.
Figure 2:
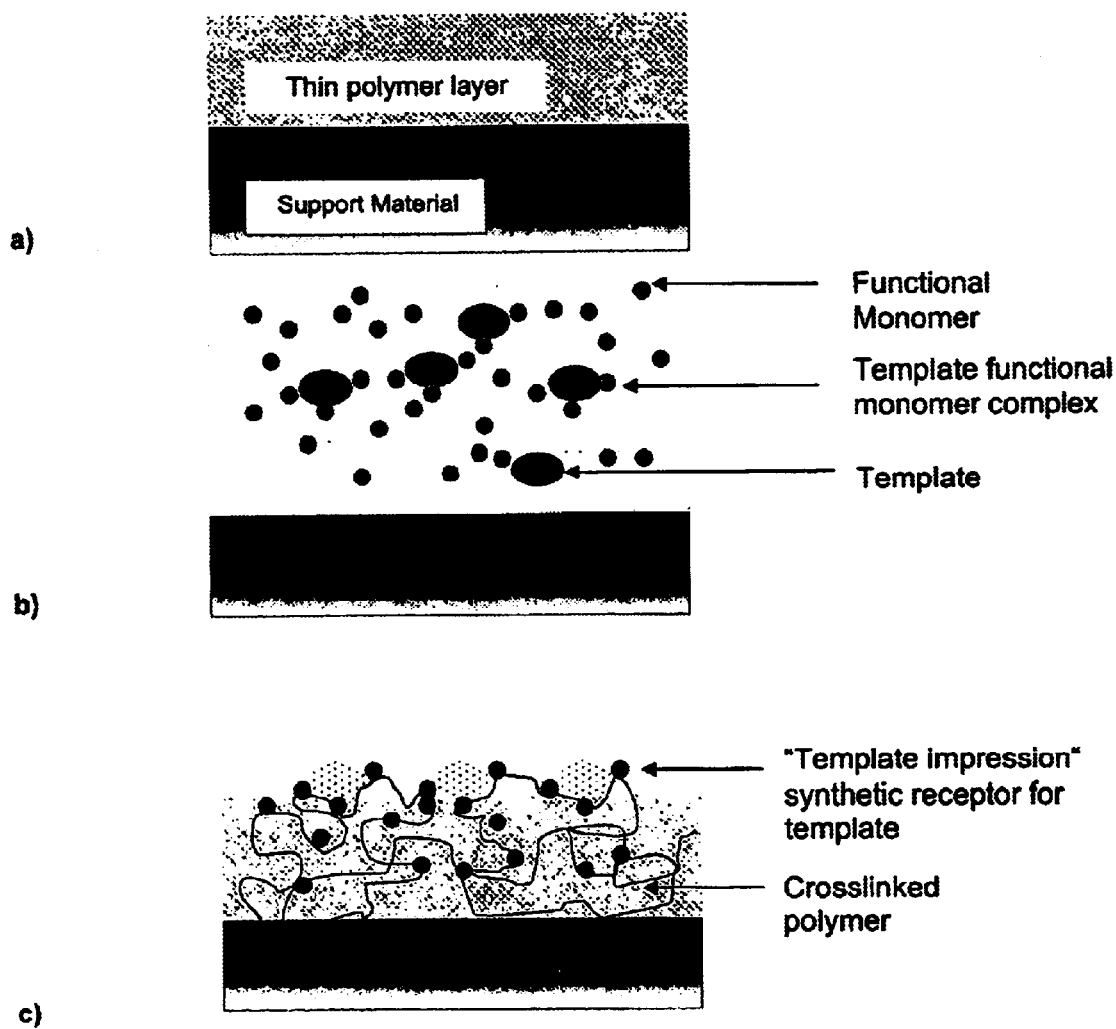
FIG. 2: Schematic illustration of the production of TTP composite materials with high specificity and selectivity by surface functionalization of special supports.

However, the template-textured materials of the invention are preferably produced on a solid support of varying morphology (film, foil, plate, reaction vessel, particle, fiber, fabric, filter, membrane) with a thin polymer layer minimizing non-specific binding of template, template derivatives and other substances (see FIG. 2). As a result of controlled crosslinking polymerization initiated selectively within the thin polymer layer in the presence of template, the TTP synthesis yields TTPs fixed covalently and/or by inclusion in the thin polymer layer ("interpenetrating network"), with template impressions over the entire exterior surface of the molded piece. Only functional groups of functional monomer molecules complexed with template during synthesis are fixed and well-accessible on the exterior surface of the TTP material. Otherwise, the thin polymer layer with its low capacity of non-specific binding determines the exterior surface of the TTP material; in control materials synthesized with no template, this is almost exclusively said thin, weakly binding polymer layer (cf., FIG. 2). As a result of the selectivity of initiation in the thin polymer layer, matrix structure and morphology of the support remain intact.

It is particularly preferred to produce the template-textured materials of the invention on solid supports of varying morphology, which supports are functionalized by surface modification using a thin polymer layer having minimal non-specific binding for the template, template derivatives and other substances. Thus, it is possible to achieve independent optimization of morphology or pore structure (capacity, permeability) and surface functionality (high specificity and selectivity as a result of template impressions and simultaneously, minimal non-specific binding). Particularly preferred is surface functionalization of e.g. nano-, ultra- or micro-filtration membranes or filters, wherein TTP membranes are synthesized according to the production method described. When filtrating through or using the materials according to the invention, the templates or template derivatives can also be bound from dilute solutions in the template impressions with high specificity. Thereafter, the templates or template derivatives can optionally be purified and subsequently either eluted under filtration conditions (as a concentrate) or detected by analysis and quantified directly on the support.

According to the invention, small molecules of up to 100 Da (e.g. triazine herbicides, chemical active agents, hormones, or amino acids), larger molecules of up to 1,000,000 Da (for example, peptides, proteins, nucleic acids, or carbohydrates) or particles such as viruses, bacteria or cells are used as templates. Particularly preferred are templates capable of interacting via ion exchange or hydrophobic binding. Using the present invention, ionic and electrostatic interactions, as well as hydrogen bonds can be utilized in the synthesis of TTP and thus, in molecular recognition in aqueous systems as well. Hydrophobic interactions may contribute in addition. Particularly in case of small molecules, this results in significant improvements and is also useful for biologically relevant molecules such as amino acids, peptides, nucleic acids, oligonucleotides, or mono- and oligosaccharides, but also for proteins, DNA and RNA, or polysaccharides, or conjugates thereof. The template concentrations in the reaction mixture for producing the materials of the invention are between 0.01 and 50%.

According to the invention, polymerizable compounds including groups capable of interacting with templates, particularly carboxyl, sulfonyl, sulfate, phosphate, amino, or quaternary ammonium groups, as well as derivatives thereof, also in admixture, are used as functional monomers. Monomers including positively or negatively charged functional groups (e.g. amino-functional acrylate, methacrylate or styrene derivatives, or acrylic acid, methacrylic acid, 2-acryloylaminopropane-2-sulfonic acid, vinylsulfonic acid, styrenesulfonic acid, or vinylphosphonic acid) are suited for the inventive production of TTP materials. In addition, hydrophobic moieties such as aromatic rings, cryptands, or cyclodextrins can be incorporated in TTP via special monomers. Monomers capable of complex formation, such as metal chelate complexes, Schiff bases, and particular esters can also be used. Also, aniline and aniline derivatives including additional functional groups can be employed in the inventive production of TTP materials. Furthermore, e.g. derivatives of phenylboronic acid capable of forming esters with diols are suitable as functional monomers. Ultimately, the functional groups in an oligomer (e.g. oligoethyleneimine) or in a polymer (e.g. agarose or polyethyleneimine) can be used in the sense of a functional monomer by way of crosslinking. The concentration of functional monomers in the reaction mixture for TTP synthesis can be between 0.01 and 99.99%.

As is well-known, the components for a template-specific TTP are predominantly selected according to the interactions between template and functional monomer (formation of a supramolecular complex). The interactions between template and functional monomers, i.e., complex formation, can be studied and quantified using e.g. UV/VIS or NMR spectroscopy. In addition, suitable crosslinkers, solvents and initiators are selected with the aim of "fixing" these interactions so as to be as effective and accessible for affinity interactions as possible.

Examples of crosslinkers are bismethacrylates of ethylene glycol, diethylene glycol, triethylene glycol, or tetraethylene glycol, or other analogous derivatives in case of functional acrylates, N,N-methylenebisacrylamide or piperazine bisacrylamide for functional acrylamides or methacrylamides, o-phenylenediamine for functional aniline derivatives, or bisepoxides for agarose. The crosslinker concentrations in the monomer mixture are between 0 and 90%.

The solvents for polymer production can be the monomer itself, water, aqueous buffer solutions, organic solvents, or mixtures thereof. In general, the optimum type of monomer obviously depends on the template structure and the conditions of polymerization.

Suitable as polymerization initiators are those compounds which (e.g. peroxides, azo compounds) upon excitation either undergo cleavage of bonds, or (in case of e.g. H-abstracting agents), by way of bimolecular reaction with other molecules/structures, will form free radicals capable of initiating polymerization. Particularly suited are photoinitiators such as benzophenone and derivatives thereof. Depending on polymerization conditions and composition, textured polymers can be produced which have the desired density, porosity, crosslinking density, and consistency. This procedure is well-known to those skilled in the art.

A variety of different support forms such as films, foils, plates, reaction vessels, microtiter plates, (micro and nano) particles, fibers, hollow fibers, fabrics, fleeces, filters, or membranes made of various organic or inorganic materials can be used in the inventive production of template-textured materials. Organic materials are polymers such as polypropylene, polyethylene, polystyrene, polysulfone, polyamides, polyesters, polycarbonate, polyacrylonitrile, poly(vinylidene fluoride), polytetrafluoroethylene, polyacrylates, polyacrylamides, cellulose, amylose, agarose, as well as derivatives, copolymers or blends thereof. Inorganic materials are e.g. glasses, silicates, ceramics, or metals or composites thereof, also including organic polymers. The supports can be non-porous or porous. Particularly preferred with regard to production and use of the new template-textured materials are supports in the form of polymer membranes which can be produced by means of processes such as precipitant- or temperature-induced phase inversion with a variety of pore structures and with the desired mechanical or other properties. The membranes preferably have symmetrical, but also asymmetrical pore structures and a pore size ranging between a few nm and 10 $\mu$m, preferably from 100 nm to 5 $\mu$m. In this way, the optimum porous matrix membranes (supports) can be selected for the desired separation and analytic processes. According to the invention, however, membranes (supports) having a thin polymer layer on the surface thereof are particularly preferred. They are either commercially available (e.g. hydrophilized PVDF membranes) or can be produced according to principally well-known procedures (e.g. U.S. Pat. No. 4,618,533).

The inventive production of the template-textured materials is performed using a reaction mixture including at least template and functional monomer. The reaction proceeds so as to retain the complex of template and functional monomer and thus, the fundamental precondition as to formation of synthetic receptors (template impressions) is given. According to the invention, neither stability nor pore structure of the support will be impaired.

By selecting the polymer layer on the support, it is possible to minimize non-specific interactions of structurally similar or different substances with TTP, in addition to achieving high affinity of the template impressions. Thus, the specificity of TTP compared to the control, as well as the selectivity of TTP for the template compared to other substances are significantly increased (cf., FIG. 2).

The following production procedure is particularly suited for the synthesis of TTP materials of the invention having high binding specificity and selectivity:
1. a) Selecting a support with a thin polymer layer on its surface, which minimizes non-specific binding of substances, e.g. template, on the support, or
   b) production of a support (during synthesis or processing of the support material or by surface modification of the support) with a thin polymer layer on its surface, which minimizes non-specific binding of substances, e.g. template, on the support;
2. Coating the support with the major portion of polymerization initiator—accumulation of initiator in the thin polymer layer;
3. Coating the support with the reaction mixture (template, functional monomer, crosslinker, solvent and/or buffer, residual portion of initiator)—sorption in the thin polymer layer;
4. Initiating the polymerization and continuing so as to reach the absorption capacity of the thin polymer layer—preferred formation of starter free radicals and polymerization in the thin polymer layer;
5. Optionally extraction of non-reacted reactants, soluble homopolymer and template.

In another embodiment of the invention, the polymerization initiator can also be added completely in step 2.

A substance forming free radicals or other starter species for polymerization upon physical or chemical excitation is employed as initiator. Functionalization can be based on the action of the thin polymer layer as co-initiator, i.e., all those polymers from which free radicals or other species capable of initiating a graft copolymerization can be generated by means of initiators can be modified in this way.

Photochemical initiation of a heterogeneous graft copolymerization (of e.g. functional acrylates) is particularly preferred in the inventive production of template-textured materials. This is done by using a photoinitiator, particularly of an H abstraction type, and selective UV irradiation of the photoinitiator in step 4. Such polymerization may proceed at low temperatures particularly favorable in TTP synthesis (T≦25° C.) where impairment of the supramolecular complex of template and functional monomer is low.

Selectively initiated chemical grafting or crosslinking of polymers (e.g. synthesis of polyaniline derivatives) on the support having the thin polymer layer is also suitable in the inventive production of template-textured materials. Also, the synthesis of an interpenetrating network by selectively initiated polymerization of the TTP in the thin polymer layer and anchoring by interpenetration and/or intertwining with no chemical reaction between the two polymers may result in TTP having high specificity and selectivity.

As is well-known, TTP syntheses can be effected using surface functionalization from aqueous or organic solvents. The degree of functionalization and thus, the surface coverage of the support with TTP can be controlled via initiation and polymerization conditions. If necessary, blocking of pores in the support can also be minimized in this way. Owing to the large number of variants, the whole spectrum of methods established for TTP synthesis is also applicable to surface functionalization of the particular support materials used according to the invention.

In the production of TTP, the binding specificity and capacity of the template-textured polymer for the template and template-like substances can be increased by adding a salt to the reaction solution (in step 3), e.g. in the form of a buffer.

To wash out the template from the TTP, it is possible to use e.g. an acid interfering with the electrostatic interactions, a salt solution having an ionic strength sufficient for dissociation, or a solvent having a different polarity. In this way, the binding sites complementary to the template structure return to the blank state in the pores or/and on the surface of the material of the invention. However, the materials of the invention can also be used with bound template.

Characterization of the properties of the materials according to the invention is effected in a basically well-known manner using well-established methods, e.g. SEM investigations, measurement of the specific surface area (BET isotherm), FT-IR-ATR spectroscopy, analytics of functional groups using photometric or fluorimetric methods, contact angle measurement, as well as permeability measurement.

Characterization of the properties of the materials according to the invention is effected in a basically well-known manner using static and dynamic sorption experiments on the template or other structurally similar or different substances. In particular, the binding capacities of the materials of the invention for template as a function of the TTP structure of the material and the test conditions (concentration, residence time, amount and volume of substance applied, rinsing conditions; particularly, also in mixtures with other substances) are essential in view of the diverse uses of the materials according to the invention.

When applied on or filtrated through template-textured materials of the invention, the templates or template derivatives are bound in the template impressions with high specificity, even from a high dilution. Thereafter, the templates or template derivatives can be purified by washing and subsequently either detected directly on the support or eluted under filtration conditions (in the form of a concentrate) (see FIG. 3). Hence, the TTP materials of the invention with high binding specificity and selectivity enable effective, substance-specific separation of materials or/and analytic determinations from organic or aqueous solutions.

The invention is also directed to the template-textured materials produced using the method of the invention and to the use thereof.

According to the invention, the new template-textured materials are used in the separation of materials and/or in the analytics of fluid or gaseous mixtures of substances, which procedures are based on the specific binding of templates or template derivatives during perfusion or diffusion through template-textured polymers or when applied on template-textured polymers.

The TTP materials of the invention provide the following uses, although it is not intended to restrict the possible uses to these concrete cases:

1. Separation: use in solid-phase extraction, chromatography, electrophoresis, membrane separation or controlled release of active agents—filtration (perfusion) or affinity filtration, diffusion (dialysis) or electrodiffusion (electrodialysis) of solutions or gaseous mixtures through the template-textured materials of the invention, or sorption thereon to effect concentration, purification, separation or subsequent analytical determination of substances;
2. Analytics: use as test strip, blotting membrane or sensitive layer in assays in reaction vessels or microtiter plates (e.g. qualitative or quantitative determinations or active agent detection/screening)—applying solutions or gaseous mixtures on TTP materials or sorption on TTP materials;
3. Sensor technique: use as receptor or/and transducer; use in optionally continuous analytical determination of substances;
4. Catalysis: use of TTP as receptor and/or catalytically active center; use in synthesis, purification, separation or analytical determination of substances.

Suitable classes of substances for the above-mentioned uses range from small molecules of up to 100 Da (e.g. triazine herbicides or hormones) up to particles such as viruses, bacteria or cells. In particular, they are biologically relevant molecules (active substances) such as amino acids, peptides, nucleic acids, oligonucleotides, or mono- and oligosaccharides, but also proteins, DNA and RNA, or polysaccharides or conjugates thereof.

Providing a combination of good affinity, high specificity and selectivity, as well as low non-specific binding, the materials of the invention involve the advantage of enabling new, highly efficient methods of substance-specific separation and analytics of materials. In particular, the TTP materials of the invention can also be produced from aqueous reaction mixtures. Thus, the method according to the invention can also be applied to biomolecules, with the activity thereof being retained. Hence, the new TTP materials can also be used in the separation and analytics of materials from/in aqueous solutions and thus, particularly in life science and biotechnology.

Without intending to be limiting, the invention will be illustrated in more detail with reference to the embodiments and figures.

EXAMPLES

Example 1

Poly(Vinylidene Fluoride) Membranes Template-Textured for Terbumeton (2-t-butylamino-4-ethyl-6-methoxy-1,3,5-triazine)

a) Variation of Functional Monomer

Round samples (4.9 cm$^2$) of hydrophilized PVDF membranes (pore size 0.22 µm; "Hydrophilisierte Durapore"; Millipore GmbH, Eschborn, Germany) are extracted with acetone and methanol, dried and weighed. Thereafter, the samples are immersed in a 150 mM solution of BP (photoinitiator) in acetone for 5 min and then dried under vacuum. Subsequently, the membranes in Petri dishes are covered with a layer of reaction solution consisting of 10 mM Terbumeton (template; PESTANAL; Riedel de Haën GmbH & Co. KG, Seelze, Germany), 50 mM AA, MAA and AMPS, respectively (functional monomer; Sigma-Aldrich), 300 mM MBAA (crosslinker; Sigma-Aldrich), and 5 mM BP in methanol. The Petri dish is covered with a glass plate (Tief UV filter, λ>310 nm). After 10 min, irradiation is effected on a UV dryer (Beltron GmbH) at half power for a total of 10 min (10 passages through the irradiation zone). Subsequently, the membranes are extracted thoroughly in a Soxhlet apparatus for 2 hours and washed with water, 50 mM hydrochloric acid, water, and methanol. Thereafter, this is dried, and the degree of modification (DM, based on exterior membrane surface) is determined by gravimetry.

Preparations under the above conditions are also carried out with non-hydrophilized PVDF membranes (pore size 0.22 µm; "Hydrophobe Durapore"; Millipore GmbH, Eschborn, Germany).

b) Variation of the Functional Monomer Concentration

Preparation is as described above; however, reaction solutions are used consisting of 10 mM Terbumeton, from 0 to 60 mM AMPS, 300 mM MBAA and 5 mM BP in methanol.

c) Variation of Crosslinker Concentration

Preparation is as described above; however, reaction solutions are used consisting of 10 mM Terbumeton, 50 mM AMPS, from 200 to 350 mM MBAA and 5 mM BP in methanol. Non-template-textured control samples are prepared in a procedure analogous to that for TTP membranes, but with no template. All results are summarized in Table 1.

TABLE 1

Degree of modification (DM, in µg/cm²) for PVDF membranes following syntheses with (TTP) or without (blank) the Terbumeton template (cf., Example 1)

| | a) Functional monomer | AA | MAA | AMPS | |
|---|---|---|---|---|---|
| hydrophilized Durapore | TTP1a | 380 | 360 | 340 | |
| | Blank1a | 320 | 310 | 340 | |
| hydrophobic Durapore | TTP1k | — | — | 0 | |
| | Blank1k | — | — | 0 | |

| b) AMPS functional monomer | 0 mM | 20 mM | 40 mM | 50 mM | 60 mM |
|---|---|---|---|---|---|
| 1 TTP1b | 350 | 370 | 380 | 340 | 410 |
| Blank1b | 380 | 400 | 380 | 340 | 420 |

| c) MBAA crosslinker | 200 mM | 225 mM | 250 mM | 275 mM | 300 mM | 325 mM | 350 mM |
|---|---|---|---|---|---|---|---|
| 2 TTP1c | 350 | 300 | 310 | 370 | 340 | 340 | 360 |
| Blank1c | 390 | 350 | 360 | 360 | 340 | 330 | 320 |

Similar DM values are obtained for TTP and blank materials under analogous conditions. A significant increase is observed for TTP1b and Blank1b from 60 mM AMPS on, indicating modification beyond the capacity of the thin hydrophilic polymer layer (cf., FIG. 2). Investigations of structure using SEM, BET, ATR-IR, as well as functional group assays establish modification with a thin functional polyacrylate layer; differences in composition between TTP and blank materials cannot be detected.

Example 2

Use of Poly(Vinylidene Fluoride) Membranes Template-Textured for Terbumeton in Substance-Specific Membrane Solid-Phase Extraction Round samples (4.9 cm²) of modified membranes as in Example 1 are mounted in a steel filter holder having a Luer-Lock connection (effective membrane area 3.8 cm²; Schleicher & Schuell GmbH, Dassel, Germany). 10 ml of a $10^{-5}$ M solution of herbicide (Terbumeton, Atrazine, Desmetryn, Terbutylazine, Metribuzin; PESTANAL; Riedel de Haën GmbH & Co. K G, Seelze, Germany) in water is filtrated quantitatively from a syringe through the membrane at a rate of 10 ml/min. Subsequently, both the filtrate and 10 ml of crude solution are extracted using 10 ml of chloroform each time. Both herbicide concentrations are then determined quantitatively using gas chromatography (HP5MS separation column; Hewlett Packard GC System HP 6890 including HP 5973 mass-selective detector); the amount bound in the membrane is calculated from the concentrations of crude solution and filtrate.

Summaries of the results are given in FIG. 4 for the variation of functional monomer (see Example 1a), in FIG. 5 for the variation of functional monomer concentration (see Example 1b), and in FIG. 6 for the variation of crosslinker concentration (see Example 1c).

At low absolute values for non-specific binding ("background"; <2 nmol/cm²), the sorption values for TTP materials are significantly higher than those for the corresponding blank materials; AMPS, being that functional monomer with the most intense complex formation with template as compared to AA and MAA, results in TTP with maximum affinity (see FIG. 4).

At relatively low absolute values for non-specific binding ("background"; <5 nmol/cm²), the sorption values for TTP materials will not be significantly higher than those for the corresponding blank materials before an AMPS concentration of 40 mM is reached; excessively high AMPS concentrations result in excessively high DM values (cf., Table 1b) and thus, in a significant increase of non-specific sorption (see FIG. 5).

It is only at an optimum crosslinker concentration that low absolute values for non-specific binding ("background"; <5 nmol/cm²) and higher sorption values for TTP materials compared to the corresponding blank materials are obtained with the functional (cation exchange) AMPS mononer (see FIG. 6).

Example 3

Poly(Vinylidene Fluoride) Membranes Template-Textured for Desmetryn (2-isopropylamino-4-methylamino-6-methylthio-1,3,5-triazine)

A round sample (46 cm²) of a hydrophilized PVDF membrane (cf., Example 1) is extracted with chloroform and methanol, dried and weighed. Thereafter, the membrane is immersed in a 100 mM solution of BP in methanol for 30 min. Subsequently, the membrane, the pores of which still being filled with BP solution, is covered in a Petri dish (d=10 cm) with a layer of reaction solution consisting of 10 mM Desmetryn (template), 50 mM AMPS (functional monomer), 100 mM MBAA (crosslinker), and 0.1 mM BP in water. The Petri dish is covered with a glass plate (Tief UV filter, λ>310 nm). After 30 min, irradiation is effected on a UV dryer (Beltron GmbH) at half power for a total of 10 min (10 passages through the irradiation zone). Subsequently, the membrane is washed thoroughly with methanol, water, 50 mM hydrochloric acid, water, and methanol again. Thereafter, this is dried, and the degree of modification (DM, based on exterior membrane surface) is determined by gravimetry. Non-template-textured control samples are prepared according to an analogous protocol, but with no template. The results for preparation conditions varied according to the above-mentioned general protocol are shown in Table 2.

TTP and blank materials can also be synthesized from aqueous solutions, and similar DM values are obtained under analogous conditions each time.

Example 4

Use of Poly(Vinylidene Fluoride) Membranes Template-Textured for Desmetryn in Substance-Specific Membrane Solid-Phase Extraction Round samples (4.9 cm²) of membranes modified according to Example 3 are mounted in a steel filter holder having a Luer-Lock connection (effective membrane area 3.8 cm²; Schleicher & Schuell GmbH, Dassel, Germany). 10 ml of a $10^{-5}$ M solution of herbicide (Desmetryn) in water or 50 mM sodium phosphate buffer (pH=5.0) is filtrated quantitatively from a syringe through the membrane at a rate of 10 ml/min. Subsequently, both the filtrate and 10 ml of crude solution are extracted using 10 ml of chloroform each time. Both herbicide concentrations are then determined quantitatively using gas chromatography (HP5MS separation column; Hewlett Packard GC System HP 6890 including HP 5973 mass-selective detector); the amount bound in the membrane is calculated from the concentrations of crude solution and filtrate, obtaining the herbicide sorption values illustrated in Table 2.

The results of binding different herbicides (see FIG. 7) show a remarkable substance specificity which is unexpected when compared to the prior art: it is only the TTP material that exhibits significant binding for a triazine herbicide, and said binding is obtained exclusively for the Terbumeton template used in synthesis, not for the structurally highly similar triazine herbicides Metribuzin, Desmetryn, Atrazine, and Terbutryn.

With small absolute values for non-specific binding ("background"; <5 nmol/cm$^2$), the sorption values for TTP materials are significantly higher than those for the corresponding blank materials. In particular, this also applies to TTP materials synthesized by varying pH and salt; the latter can bind template specifically from buffer solutions as well.

The TTP-bound herbicide can be eluted from the membrane by altering the pH or increasing the salt concentration. Thus, using 10 ml of a 100 mM solution of sodium chloride in water, 89% is eluted from the TTP 2/1 membrane after Desmetryn sorption from water (cf., Table 2). In an analogous fashion, with a sorption of 100% and a retrieval of 90%, the herbicide can be accumulated by 1000 fold from a $1 \times 10^{-9}$ M solution, i.e., substance-specific solid-phase extraction can be used both in purification and concentration. The TTP membranes can be used repeatedly after a simple regeneration, without loss of specificity and capacity.

TABLE 2

Degrees of modification (DM; cf., Example 3) and Desmetryn sorption (from water or buffer, pH 5.0) in filtration (cf., Example 4) for hydrophilized PVDF membranes following syntheses with (TTP) and without (blank) the Desmetryn template

| PVDF-h | PH | Reaction solution: salt (nM) | Functional-ization DM ($\mu$g/cm$^2$) | Sorption S | n (mol/cm$^2$)/% |
|---|---|---|---|---|---|
| TTP 2/1 | 1.5 | 1 | 305 | Water | 17.2/65.4 |
| Blank 2/1 | 1.5 | 1 | 285 | Water | 2.0/7.6 |
| TTP 2/1 | 1.5 | 1 | 305 | Buffer | 3.0/11.4 |
| Blank 2/1 | 1.5 | 1 | 285 | Buffer | 3.2/12.2 |
| TTP 2/2 | 1.5 | 50 | 310 | Buffer | 13.9/52.9 |
| Blank 2/2 | 1.5 | 50 | 290 | Buffer | 4.2/16.0 |
| TTP 2/3 | 2.1 | 50 | 320 | Buffer | 9.9/37.6 |
| Blank 2/3 | 2.1 | 50 | 305 | Buffer | 3.8/14.4 |

Example 5

Production of a Polypropylene Membrane Support Having a Thin Hydrophilic Crosslinked Polymer Layer (PP-h)

A PP membrane (39 cm$^2$; pore size 0.2 $\mu$m; Accurel PP 2E HF; Akzo-Nobel AG, Wuppertal, Germany) is equilibrated with a 100 mM solution of BP in acetone with agitation for 2 hours. The membrane is taken out of the solution and, following removal of the solution adhering to the outside thereof, immediately covered in a Petri dish with a layer of a reaction solution consisting of 75 g/l 2-hydroxypropyl methacrylate and 7.5 g/l tetraethylene glycol bismethacrylate (each from Röhm GmbH, Darmstadt, Germany) in water saturated with BP. The Petri dish is covered with a glass plate (Tief UV filter, $\lambda$>310 nm). After 5 min, irradiation is effected on a UV dryer (Beltron GmbH) at half power for a total of 10 min (10 passages through the irradiation zone). Subsequently, the membrane is extracted in a Soxhlet apparatus with water for 2 hours and subsequently washed with acetone and methanol. Thereafter, this is dried, and the degree of modification is determined by gravimetry: DM (PP-h)=320 $\mu$g/cm$^2$. Given the specific surface area of the membrane material (PP) of 17.5 m$^2$/g and assuming a density of the graft polymer of 1 g/cm$^3$, this DM value corresponds to a layer thickness of the hydrophilic crosslinked polymer layer of about 10 nm.

Surface-modified membranes having a thin polymer layer with lower non-specific binding due to hydrophilicity can be produced as special supports for the inventive TTP synthesis.

Example 6

Polypropylene Membrane Template-Textured for Terbumeton and Its Use in Membrane Solid-Phase Extraction A PP membrane (39 cm$^2$; PP-h) modified according to Example 5 is immersed in a 150 mM solution of BP in acetone for 5 min and then dried under vacuum. Subsequently, the membrane in a Petri dish is covered with a layer of reaction solution consisting of 10 mM Terbumeton (template), 50 mM AMPS (functional monomer), 300 mM MBAA (crosslinker), and 5 mM BP in methanol. The Petri dish is covered with a glass plate (Tief UV filter, $\lambda$>310 nm). After 10 min, irradiation is effected on a UV dryer (Beltron GmbH) at half power for a total of 10 min (10 passages through the irradiation zone). Subsequently, the membrane is extracted thoroughly in a Soxhlet apparatus for 2 hours and washed with water, 50 mM hydrochloric acid, water, and methanol. Thereafter, this is dried, and the degree of modification is determined by gravimetry (see Table 3). A non-template-textured control sample is prepared according to an analogous protocol, but with no template. Following functional characterization as described in Example 2, the values illustrated in Table 3 are obtained for herbicide sorption.

TABLE 3

Degrees of modification (DM) and Terbumeton sorption from water in filtration for hydrophilized PP membranes following syntheses with (TTP) and without (blank) the Terbumeton template

| PP-h | Functionalization DM ($\mu$g/cm$^2$) | Sorption n (nmol/cm$^2$)/% |
|---|---|---|
| TTP 3/1 | 345 | 11.1/42.2 |
| Blank 3/1 | 325 | 2.1/8.0 |
| PP, non-modified | — | 22.4/85.0 |

With low absolute values for non-specific binding ("background", <3 nmol/cm$^2$; cf., "PP, non-modified") which is due to previous coating with a thin, crosslinked, hydrophilic polymer layer (cf., Example 5), the sorption values for TTP materials are significantly higher than those for the corresponding blank materials.

Example 7

Polypropylene Membrane Template-Textured for Desmetryn and Its Use in Membrane Solid-Phase Extraction A PP membrane (39 cm$^2$; PP-h) modified according to Example 5 is immersed in a 100 mM solution of BP in methanol for 30 min. Subsequently, the membrane, the pores of which still being filled with BP solution, is covered in a Petri dish (d=10 cm) with a layer of reaction solution consisting of 10 mM Desmetryn (template), 50 mM AMPS (functional monomer), 100 mM MBAA (crosslinker), and 0.1 mM BP in water. The Petri dish is covered with a glass plate (Tief UV filter, $\lambda$>310 nm). After 30 min, irradiation is effected on a UV dryer (Beltron GmbH) at half power for a total of 10 min (10 passages through the irradiation zone).

Subsequently, the membrane is washed thoroughly with methanol, water, 50 mM hydrochloric acid, water, and methanol again. Thereafter, this is dried, and the degree of modification is determined by gravimetry. A non-template-textured control sample is prepared according to an analogous protocol, but with no template (see Table 4). Following functional characterization as described in Example 4, the values illustrated in Table 4 are obtained for herbicide sorption.

TABLE 4

Degrees of modification (DM) and Desmetryn sorption from water in filtration (cf., Example 4) for hydrophilized PP membranes following syntheses with (TTP) and without (blank) the Desmetryn template

| PP-h | Functionalization DM ($\mu g/cm^2$) | Sorption n ($nmol/cm^2$)/% |
|---|---|---|
| TTP 4/1 | 315 | 9.9/37.6 |
| Blank 4/1 | 310 | 1.2/4.6 |
| PP, non-modified | — | 11.6/44.0 |

With low absolute values for non-specific binding ("background"; <2 $nmol/cm^2$; cf., "PP, non-modified") which is due to previous coating with a thin, crosslinked, hydrophilic polymer layer (cf., Example 5), the sorption values for TTP materials are significantly higher than those for the corresponding blank materials even upon synthesis from aqueous reaction mixtures.

The very high specificity of the TTP materials according to the invention (as compared to the control samples) and the very high template selectivity (in relation to other structurally highly similar triazine herbicides), as well as the flexibility of the synthetic process compared to the prior art will be illustrated in Table 5.

TABLE 5

Comparison of the TTP materials of the invention with prior art materials (synthesis by surface functionalization via graft-photopolymerization: functional monomer: AMPS, stoichiometry relative to template: 5:1, crosslinker: MBAA) relating to the use in membrane solid-phase extraction (selectivity: in all cases comparison between sorption for Terbumeton and Desmetryn)

| Synthesis | | | Membrane solid-phase extraction | | |
|---|---|---|---|---|---|
| | Template | Solvent | Non-specific sorption n ($nmol/cm^2$) | Specificity TTP/Blank | Selectivity template/non-template |
| PP[#] | Desmetryn | Water | 15.0 | 1.6 | 1.08 |
| PVDF | Desmetryn | Water | Synthesis not possible | | |
| PP-h[a] | Desmetryn | Water | 1.2 | 8.2 | n.d. |
| PVDF-h[b] | Desmetryn | Water | 2.0 | 8.6 | 6.9 |
| PP[#] | Terbumeton | MeOH | Synthesis not possible | | |
| PVDF | Terbumeton | MeOH | Synthesis not possible | | |
| PVDF-h[c] | Terbumeton | MeOH | 2.1 | 5.3 | n.d. |
| PVDF-h[d] | Terbumeton | MeOH | 0.5 | 22.0 | 10.8 |

[a]TTP4; cf., Example 7;
[b]TTP2; cf., Example 3;
[c]TTP3; cf., Example 6;
[d]TTP1; cf., Examples 1 and 2;
[#]synthesis on support with no thin polymer layer (prior art)

Example 8

Polyaniline-Modified Polypropylene Membrane Textured for Metribuzin (4-amino-3-methylthio-6-tert-butylamino-1,2,4-triazin-5-one) and Its Use in Membrane Solid-Phase Extraction A PP membrane (25 $cm^2$) modified according to Example 5 is placed in 10 ml of a 200 mM solution of aniline hydrochloride and 50 mM Metribuzin in water. After 10 min, 10 ml of a 100 mM solution of ammonium peroxodisulfate oxidant is added and reacted for 15 min with agitation (300 rpm). Subsequently, the membrane is washed thoroughly with 10 mM hydrochloric acid, water, and methanol. Thereafter, this is dried, and the degree of modification is determined by gravimetry. A non-template-textured control sample is prepared according to an analogous protocol, but with no template (see Table 6). Following functional characterization with Metribuzin in the way as described in Example 2, the values illustrated in Table 4 are obtained for herbicide sorption.

Chemical initiation of grafting and crosslinking of a functional polymer on a special support with a thin polymer layer is also suitable as an alternative synthesis of the TTP materials according to the invention.

TABLE 6

Degrees of modification (DM) and Metribuzin sorption from water in filtration (cf., Example 4) for hydrophilized PP membranes following syntheses with (TTP) and without (blank) the Metribuzin template

| PP-h | Functionalization DM ($\mu g/cm^2$) | Sorption n ($nmol/cm^2$)/% |
|---|---|---|
| TTP 5/1 | 210 | 7.9/30.0 |
| Blank 5/1 | 230 | 4.1/15.6 |

Example 9

Modification of Polypropylene Microtiter Plates with a Thin Hydrophilic Crosslinked Polymer Layer (PP-h)

100 $\mu l$ of a 100 mM solution of BP in acetone is pipetted in each well of a 96 well microtiter plate made of PP (flat bottom; Corning Costar Germany, Bodenheim), and the plate is sealed. After 2 hours, the solution is pipetted out, the wells are rinsed with 120 $\mu l$ of a 1 mM solution of BP in acetone for 10 seconds and subsequently air-dried for 15 minutes. Thereafter, 100 $\mu l$ of a reaction solution consisting of 75 g/l 2-hydroxypropyl methacrylate (Röhm) and 7.5 g/l tetraethylene glycol bismethacrylate (Röhm) in water saturated with BP is pipetted in each well. The microtiter plate is covered with a glass plate (Tief UV filter, $\lambda$>310 nm). After 5 min, irradiation is effected on a UV dryer (Beltron GmbH) at half power for a total of 10 min (10 passages through the irradiation zone). Subsequently, the microtiter plate is washed with hot water first, and then with acetone and methanol.

Surface-modified microtiter plates with a thin polymer layer having low non-specific binding can be produced as special supports for TTP synthesis according to the invention.

Example 10

Microtiter Plate Textured for Atrazine (MTP-TTP)

100 $\mu l$ of a 100 mM solution of BP in acetone is pipetted in each well of a 96 well microtiter plate modified according to Example 9 (PP-h), and the plate is sealed. After 2 hours, the solution is pipetted out, the wells are rinsed with 120 µl of a 1 mM solution of BP in acetone for 10 seconds and subsequently air-dried for 15 minutes. Thereafter, 100 µl of a reaction solution consisting of 10 mM Atrazine (template), 50 mM AMPS (functional monomer), 300 mM MBAA (crosslinker), and 5 mM BP in methanol is pipetted in each well. The microtiter plate is covered with a glass plate (Tief UV filter, λ>310 nm). After 30 min, irradiation is effected on a UV dryer (Beltron GmbH) at half power for a total of 10 min (10 passages through the irradiation zone). Subsequently, the microtiter plate is washed with hot water first, and then with 50 mM hydrochloric acid, water and methanol. A control preparation (MTP-Blank) is produced in an analogous fashion, but with no Atrazine.

Example 11

Replacement of Biological Receptors (in this Case: Antibodies to Atrazine) in Microtiter Plate Assays by TTP Surfaces The surfaces of the PP microtiter plate wells (MTP-TTP) obtained in Example 10 exhibit properties of artificial antibodies to Atrazine, and this can be utilized in a competitive triazine assay:

50 µl of a solution of herbicide (Atrazine or Metribuzin) at concentrations of from $10^{-7}$ to $10^{-4}$ M in water and then 50 µl of Atrazine-peroxidase conjugate solution (from the PESTANAL Atrazine ELISA Kit; Riedel de Haën) are pipetted into different TTP Wells and incubated with agitation at room temperature for 2 hours. Subsequently, this is washed, developed and quenched according to the protocol of the commercial assay (see above). The absorbances at 450 nm are measured in a microtiter plate reader; measurements made in wells wherein modification has been effected without template (MTP-Blank) and determinations using another herbicide are used as controls (see Table 7).

TABLE 7

Results of a competitive assay for Atrazine using Atrazine-peroxidase conjugate and developer solutions (POD Assay) from a commercial Atrazine ELISA kit with Atrazine-textured (MTP-TTP) and control wells (MTP-Blank) of a PP microtiter plate

| | Absorbance (450 nm) | | | |
|---|---|---|---|---|
| Atrazine concentration (M) | $10^{-7}$ | $10^{-6}$ | $10^{-5}$ | $10^{-4}$ |
| MTP-TTP | 0.75 | 0.69 | 0.61 | 0.55 |
| MTP-Blank | 0.78 | 0.73 | 0.76 | 0.69 |
| Metribuzin concentration (M) | $10^{-7}$ | $10^{-6}$ | $10^{-5}$ | $10^{-4}$ |
| MTP-TTP | 0.75 | 0.75 | 0.72 | 0.70 |
| MTP-Blank | 0.78 | 0.77 | 0.74 | 0.72 |

In an assay relating to the analytics of herbicides in an ELISA formate and according to an established ELISA protocol, the new TTP materials show pronounced specificity (TTP vs. blank) and selectivity (Atrazine template vs. Metribuzin non-template).

Example 12

Microtiter Plate Textured for Peroxidase (MTP-TTP)

In the wells of a 96 well microtiter plate modified according to Example 9 (PP-h), aniline is polymerized according to the following protocol: 20 µl of ammonium peroxodisulfate (250 mM in water) is pipetted into 30 µl of a solution of aniline hydrochloride (720 mM) and horseradish peroxidase (1.67 mg/ml) in water, and this is mixed thoroughly and reacted at room temperature with agitation for 2 hours. Thereafter, this is washed thoroughly with water and subsequently with 10 mM sodium phosphate buffer (pH=7.5). A control preparation (HP-Blank) is produced in an analogous fashion, but with no peroxidase.

Example 13

Replacement of Biological Receptors (in this Case: Antibodies to Peroxidase) in Microtiter Plate Assays by TTP Surfaces A microtiter plate modified according to Example 12 exhibits properties of artificial antibodies to peroxidase. To demonstrate the affinity of TTP surfaces for the template, horseradish peroxidase is adsorbed from a solution at a concentration of 1 g/l with agitation at room temperature for 2 hours. Thereafter, this is washed thoroughly with 10 mM sodium phosphate buffer (pH=7.5), followed by measuring the POD activity using the developer solutions from the PESTANAL Atrazine ELISA Kit (Riedel de Haën) according to the protocols of the kit. Significantly higher absorbance values (450 nm) for the TTP surface (MTP-TTP/POD: 0.27±0.08) compared to the non-textured control sample (MTP-Blank/POD: 0.12±0.06) indicate preferred binding of peroxidase to the synthetic receptor structures.

Example 14

Production of Microparticle Supports with a Thin Hydrophilic Crosslinked Polymer Layer (MP-h)

A suspension (100 mg/ml; 10 ml) of microparticles (diameter: 3 µm, styrene-MSA copolymer core with hydroxy-functional surface; microcaps GmbH, Rostock, Germany) in water is added with 10 ml of a freshly prepared solution of 50 g/l 2-hydroxypropyl methacrylate and 5 g/l tetraethylene glycol bismethacrylate in 0.08 M aqueous nitric acid with vigorous stirring, and this is purged intensively with nitrogen and heated to 50° C. Thereafter, $4 \times 10^{-3}$ M ceric ammonium nitrate is added, and the polymerization is performed for 2 hours at 50° C. under nitrogen and with vigorous stirring. Thereafter, 80 ml of water is added, and this is centrifuged, washed with methanol, resuspended in water, and subsequently washed thoroughly with water (dialysis against water).

Surface-modified microparticles with a thin polymer layer having low non-specific binding due to hydrophilicity can be produced as special supports for the TTP synthesis according to the invention.

Example 15

Microparticles Textured for Atrazine (MP-TTP)

A suspension (100 mg/ml; 5 ml) of microparticles modified according to Example 14 in methanol (MP-h) is added with 5 ml of a reaction solution consisting of 20 mM Atrazine (template), 100 mM AMPS (functional monomer), 600 mM MBAA (crosslinker), and 20 mM BP in methanol. The suspension is placed in a flat dish on a stirring plate, covered tightly with a glass plate, purged with nitrogen, and stirred vigorously. After 30 min, irradiation is effected for 15 min, using a UV lamp (UVA Spot 2000 with Tief UV filter H2; Dr. Hönle GmbH, Planegg, Germany). Thereafter, 40 ml of water is added; this is centrifuged and subsequently washed with hot water first, then with 50 mM hydrochloric acid, water and methanol (each time completed by centrifuging); this is followed by resuspending and thorough washing with water (dialysis). A control preparation (MP-Blank) is produced in an analogous fashion, but with no Atrazine.

Example 16

Replacement of Biological Receptors (in this Case: Antibodies to Atrazine) in Microparticle Assays by TTP Surfaces The surfaces of the microparticles obtained in Example 15 (MP-TTP) exhibit properties of artificial antibodies to Atrazine, and this can be utilized in a competitive triazine assay:

50 μl of a solution of herbicide (Atrazine or Metribuzin) at concentrations of $10^{-5}$ M in water and then 50 μl of Atrazine-peroxidase conjugate solution (from the PESTA-NAL Atrazine ELISA Kit; Riedel de Haën) are pipetted into each well of a 96 well MultiScreen filter plate (PVDF membrane; Millipore GmbH, Eschborn, Germany) including 200 μl of microparticle suspension (100 mg/ml) and incubated with agitation at room temperature for 2 hours. This is followed by sucking off, washing, developing and quenching according to the protocol of the commercial assay (see above). The solutions are removed, and the absorbances at 450 nm are measured in a UV spectrometer; measurements on particles modified without template (MTP-Blank) and determinations using another herbicide are used as controls (see Table 8).

In a solid-phase assay relating to the analytics of herbicides in an ELISA formate and according to an established ELISA protocol, the new TTP materials show pronounced specificity (TTP vs. blank) and selectivity (Atrazine template vs. Metribuzin non-template).

TABLE 8

Results of a competitive assay for Atrazine using Atrazine-peroxidase conjugate and developer solutions (POD Assay) from a commercial Atrazine ELISA kit with Atrazine-textured (MP-TTP) and control (MP-Blank) microparticles

| Concentration $10^{-5}$ M | Absorbance (450 nm) | |
|---|---|---|
| | Atrazine | Metribuzin |
| MTP-TTP | 0.75 | 0.81 |
| MTP-Blank | 0.86 | 0.85 |

Abbreviations:

| AA | Acrylic acid |
|---|---|
| AMPS | 2-Acryloylamino-propane-2-sulfonic acid |
| BET | Brunauer-Emmet-Teller; method of measuring adsorption isotherms to determine the specific surface area of solids |
| BP | Benzophenone |
| DM | Degree of modification |
| ELISA | Enzyme-linked immunosorbent assay |
| FT-IR-ATR | Fourier Transform Infrared-Attenuation of Total Reflexion |
| GC | Gas chromatography |
| S | Solvent |
| M | mol/l; concentration |
| MAA | Methacrylic acid |
| MBAA | N,N'-Methylenebisacrylamide |
| mM | mmol/l; concentration |

-continued

Abbreviations:

| MTP | Microtiter plate |
|---|---|
| MP | Microparticle |
| n | Quantity of substance |
| POD | Peroxidase |
| PP | Polypropylene |
| PVDF | Poly(vinylidene fluoride) |
| SEM | Scanning electron microscopy |
| TTP | Template-textured polymers |
| UV | Ultraviolet |

What is claimed:

1. A method of producing a template-textured material by crosslinking polymerization of functional monomers in the presence of a template on a support, wherein the method comprises, providing a two-layered support, the first layer comprising a solid supporting material, and the second layer comprising a thin polymer layer on the surface of the first layer;

contacting the two-layered support with a reaction mixture comprising polymerization initiator, template, molecule, functional monomer, crosslinking agent, solvent and/or buffer, wherein the contacting is performed for period of time to affectively permit sorption of the reaction mixture into the thin polymer;

initiating the polymerization and continuing the polymerization until the maximum extent of absorption of the thin polymer layer is reached, and, optionally, removing the template, wherein the solid supporting material is non-absorbant with respect to the reaction mixture.

2. The method according to claim 1, wherein the reaction mixture is added in such a way that initially, the major portion of the polymerization initiator in a solvent is added and subsequently, the reaction mixture comprised of initiator residual amount, template, functional monomer, crosslinker, solvent and/or buffer is added.

3. The method according to claim 1, wherein the reaction mixture is added in such a way that initially, the entire polymerization initiator in a solvent is added and subsequently, the residual reaction mixture comprised of template, functional monomer, crosslinker, solvent and/or buffer is added.

4. The method according to claim 1, wherein a molded piece made of a hydrophobic material is used as support, and a layer of a hydrophilic polymer is used as thin polymer layer.

5. The method according to claim 1, wherein an inorganic solid is used as support, and a layer of a hydrophilic or hydrophobic polymer is used as thin polymer layer.

6. The method according to claim 1, wherein a molded piece comprised of a highly crosslinked organic polymer is used as support, and a layer of a hydrophilic or hydrophobic polymer is used as thin polymer layer.

7. The method according to any of claim 4, 5 or 6, wherein films, foils, plates, particularly microtiter plates, reaction vessels of any shape, particles, particularly micro- or nanoparticles, fibers, particularly hollow fibers, fabrics, fleeces, filters, or membranes made of inorganic or organic materials are used as support.

8. The method according to claim 4, wherein
hydrophobic organic polymers are used as hydrophobic support materials, preferably polypropylene, polyethylene, polystyrene, polysulfone, hydrophobic polyamides, hydrophobic polyesters, polycarbonate, polyacrylonitrile, poly(vinylidene fluoride), polytetrafluoroethylene, hydrophobic polyacrylates, as well as derivatives, copolymers or blends of these polymers.

9. The method according to claim 5, wherein
glasses, silicates, ceramics, or metals or composites thereof, also including hydrophobic or crosslinked organic polymers, are used as inorganic solids.

10. The method according to claim 6, wherein
highly crosslinked polystyrene and polystyrene derivatives or copolymers, or highly crosslinked polyacrylates are used as highly crosslinked organic polymer.

11. The method according to claim 7, wherein
a porous membrane having a pore size between 2 nm and 10 μm, preferably from 100 nm to 5 μm, is used as support.

12. The method according to claims 4, wherein
a layer of crosslinked or non-crosslinked hydrophilic polyacrylates, polyacrylamides, cellulose, amylose, agarose, as well as derivatives, copolymers or blends thereof, particularly of 2-hydroxypropyl methacrylate crosslinked with tetraethylene glycol bismethacrylate, is used as thin hydrophilic polymer layer.

13. The method according to claim 5 or 6, wherein
a layer of crosslinked or non-crosslinked fluorinated polymers, silicones, paraffins, or waxes, as well as derivatives, copolymers or blends thereof is used as thin hydrophobic polymer layer.

14. The method according to claim 1, wherein
the thickness of the polymer layer on the support is from 1 nm to 1 μm, preferably about 5 to 20 nm.

15. The method according to claim 4, wherein
a hydrophilized poly(vinylidene fluoride) membrane is used as hydrophobic support having a thin hydrophilic polymer layer on the surface thereof.

16. The method according to claim 1, wherein
the polymerization is conducted as a photoinitiated crosslinking graft copolymerization of the functional monomers, using an H abstraction type substance as photoinitiator and the thin polymer layer as co-initiator.

17. The method according to claim 1, wherein
small molecules having a molecular mass of up to 100 Da, larger molecules of up to 1,000,000 Da, or even microorganisms or cells are used as templates.

18. The method according to claim 1, wherein
polymerizable compounds including groups capable of interacting with templates, particularly carboxyl, sulfonyl, sulfate, phosphate, amino, or quaternary ammonium groups, or derivatives thereof, also in admixture, preferably AMPS, MAA or AA, are used as functional monomers.

19. A template-textured material, produced according to the method as claimed in claims 1.

* * * * *